United States Patent [19]

Lugli et al.

[11] 3,816,372

[45] June 11, 1974

[54] URANIUM COMPLEXES AND PROCESS FOR PREPARING SAME

[75] Inventors: Gabriele Lugli, San Donato Milanese; Gabriella Brandi, Milan, both of Italy

[73] Assignee: Snam Progetti S.p.A., San Donato, Milanese, Italy

[22] Filed: Aug. 20, 1971

[21] Appl. No.: 173,687

[30] Foreign Application Priority Data
Aug. 20, 1970   Italy................................ 28800/70

[52] U.S. Cl. ............................................ 260/429.1
[51] Int. Cl. .............................................. C07f 5/00
[58] Field of Search ................................ 260/429.1

[56] References Cited
UNITED STATES PATENTS

| | | | |
|---|---|---|---|
| 2,818,416 | 12/1957 | Brown et al. ...................... | 260/429 |
| 3,032,569 | 5/1962 | Freeman et al. ..................... | 260/429 |
| 3,071,605 | 1/1963 | Morehouse ........................ | 260/429 |
| 3,152,157 | 10/1964 | Shapiro ............................ | 260/438 |
| 3,468,921 | 9/1969 | Wilke ............................... | 260/429 |
| 3,475,471 | 10/1969 | Maxfield ........................... | 260/429 |

*Primary Examiner*—Benjamin R. Padgett
*Assistant Examiner*—R. L. Tate

[57] ABSTRACT

There are provided tetravalent uranium complexes containing metal carbonium σ bonds having the general formula $$L_n U^{IV} R_{(4-n)}$$

wherein L is a ligand, e.g., cyclopentadienyl, allyl or cyclobutadiene, R is a hydrocarbon radical, e.g., aryl, alkyl, cycloalkyl, alkylaryl or arylalkyl and n is from 0 to 3. The new compounds are prepared by reacting the corresponding $L_n U^{IV} X_{(4-n)}$ wherein X is halogen with the corresponding organometallic reagent, R—M$^I$ or R—M$^{II}$. The new compounds are useful homogeneous phase catalysts, e.g., in the oligimerization of olefins and in absorption reactions, such as absorption of carbon monoxide.

6 Claims, No Drawings

URANIUM COMPLEXES AND PROCESS FOR PREPARING SAME

The present invention relates to new uranium complexes, to the process for obtaining same and to their employment in some chemical reactions.

More particularly the present invention relates to uranium complexes having the general formula $$L_n U^{IV} R(4-n)$$

in which L is a ligand coordinated to the metal by $\pi$ bonds as, for example, cyclopentadienyl, allyl, cyclobutadiene; R is a hydrocarbon radical as, for example, aryl, alkyl, cycloalkyl, alkylaryl, arylalkyl, and n is a number ranging from 0 to 3.

Moreover it relates to the preparation of the aforesaid compounds and to their employment as absorbers of gas molecules, particularly carbon monoxide.

It is known from the art that there are uranium complexes having ligand molecules of the type $$L_4 U^{IV} \quad \text{and} \quad L_n U X(4-n)$$

wherein L and n have the aforesaid meanings and X is a halogen atom; nevertheless uranium complexes have not yet been prepared having at least a hydrocarbon radical bound to the metal atom by a $\sigma$-bond.

It has now been found that it is possible to prepare the inventive compounds in which at least a hydrocarbon radical R is bound to uranium by a $\sigma$-bond. For example the inventive compounds are obtained by reacting a uranium compound as $$L_n U^{IV} X(4-n)$$

with a compound of the type $R-M^I$ or $R-M^{II}-X$ wherein L, X, R and n have the abovesaid meanings, $M^I$ is a monovalent metal and $M^{II}$ is a divalent metal. Such a reaction is carried out in polar solvents at a temperature ranging from $-30°C$ to $+30°C$ and at atmospheric pressure.

It has moreover been found, as a further object of the present invention, that the uranium complexes may be employed as catalysts, in the homogeneous phase, of numerous chemical reactions.

Such a surprising catalyst activity is for example shown in the oligomerizations of olefins and diolefins, and in the insertion reactions of neutral molecules as CO, NO and the like.

The use of the uranium complexes, which are the object of the present invention, and some other working particulars will be pointed out by the following examples, which are intended to be illustrative but unrestrictive of the invention.

EXAMPLE 1

20.3 g of $(C_5H_5)_3$ U Cl (43.5 mmoles) in 150 cm³ of anhydrous tetrahydrofuran were put into a 500 cc three necks flask provided with a mechanical stirrer, dropping funnel and an inlet for inert gas (Argon).

The solution was cooled at about $-10°C$, and 63 cm³ of an 0.7 molar solution lithium phenyl in ethyl ether were added slowly dropwise in three hours.

At the end of the addition, the mixture was returned to room temperature and the obtained green-yellow precipitate was filtered under argon by employing sintered glass filters ($G_4$) and washed by anhydrous ethyl ether. The solid was dried under high vacuum ($10^{-4}$ mm Hg) at 50°C for 4 hours. The formed lithium chloride remained dissolved in the filtered ether solution.

The dried product weighed 15.6 g corresponding to a 70% yield.

The elementary analysis corresponded to the raw formula $C_{21} H_{20} U$:

|  | U | C | H |
|---|---|---|---|
| Found: | 46.14% | 48.95% | 4.33% |
| Calculated: | 46.67% | 49.40% | 3.93% |

The structure definition was obtained by infrared spectrum and the analysis by mass spectrography.

The IR spectrum showed main absorptions at 3,090, 3,020, 2,940, 1,440, 1,010, 800, 776, 720, 700, 620, 600, 230 cm⁻¹.

Among these, the 3,090, 2,940, 1,010 and 800 cm⁻¹ and absorptions are the characteristic ones of cyclopentadienyl ligands $\pi$-bound to the metal, while the phenyl group gives rise to the bands at 720, 700 and 620 cm⁻¹.

The mass spectrography showed molecular ion at m/e = 510 corresponding to $[U (C_5H_5)_3 C_6H_5]^+$ and many fragmentation ions at m/e = 444 $[M - C_6H_6]^+$, 433 $[U C_{P_3}]^+$ and 368 $[UC_{P_2}]^+$.

EXAMPLE 2

This was performed according to example 1, by using 9 g. (20.5 mmoles) of $(C_5H_5)_2 UCl_2$ and 59 cc of an 0.7 molar ether solution of lithium phenyl: 6.1 g. of product were obtained corresponding to about 50% yield.

The chemical analysis, carried out on the solid, agreed with the following raw formula: $C_{22} H_{20}U$.

EXAMPLES 3 and 4

By working according to Example 1, the uranium complexes were prepared corresponding to the aforementioned general formula, the meanings of the substituents thereof are reported in the following table:

| Example | R | L | n |
|---|---|---|---|
| 3 | methyl | cyclopentadiene | 3 |
| 4 | benzyl | " | 4 |

The obtained products were identified by elementary analysis and infrared spectrometry.

EXAMPLE 5

By working according to Example 1, 2.97 g. of $C_P U C_6H_5$ were synthetized. This was again suspended in 70 cm³ of anhydrous tetrahydrofuran and reacted with 144 N cc of carbon oxide.

The color was changing, while CO being absorbed, from yellow-green to brown and, at the same time, the solubility of the starting complex increased. The filtered reaction solution showed, by IR analysis, the characteristic absorption bands of cyclopentadiene, phenyl group and CO at about 1,600 cm⁻¹ showing the neutral unsaturated molecule was inserted into the reactive Uranium-carbonium bond.

What we claim is:

1. Tetravalent uranium complexes containing metal-carbonium $\sigma$ bonds having the general formula
$$L_n U^{IV} R(4-n)$$
in which L is a ligand coordinated to the metal by $\pi$ bonds selected from cyclopentadienyl, allyl and cyclobutadienyl, R is a hydrocarbon radical selected from the group consisting of aryl, alkyl, cycloalkyl, alkylarlyl and arylalkyl and n is a number ranging from 0 to 3.

2. Tetravalent uranium complexes according to claim 1 characterized in that L is cyclopentadienyl.

3. Tetravalent uranium complexes according to claim 1 characterized in that R is selected from the group consisting of phenyl, methyl and benzyl.

4. A process for preparing tetravalent uranium complexes having the general formula $L_n \ U^{IV} \ R(4-n)$ characterized in that a uranium compound as $L_n \ U^{IV} \ X(4-n)$ is reacted with a compound of the type R—M$^I$ or R—M$^{II}$, wherein L is a ligand coordinated to the metal by $\pi$ bonds selected from cyclopentadienyl, allyl and cyclobutadienyl, R is a hydrocarbon radical selected from the group consisting of aryl, alkyl, cycloalkyl, alkylaryl and arylalkyl and n is a number ranging from 0 to 3, X is a halogen, M$^I$ is a monovalent metal, M$^{II}$ is a divalent metal, such a reaction being carried out at atmospheric pressure and at a temperature ranging from —30° to +30°C in the presence of a polar solvent.

5. A process according to claim 4 characterized in that the uranium compound is reacted with a compound selected from the group consisting of lithium phenyl, lithium methyl and lithium benzyl.

6. A process according to claim 4 characterized in that the reaction is carried out in presence of anhydrous tetrahydrofuran.

* * * * *